United States Patent
Lee et al.

(10) Patent No.: US 12,265,727 B2
(45) Date of Patent: Apr. 1, 2025

(54) MEMORY CONTROLLER FOR CONTROLLING ALLOCATION RATIO OF BUFFER MEMORY, MEMORY SYSTEM INCLUDING THE SAME, AND METHOD OF OPERATING MEMORY CONTROLLER

(71) Applicant: SAMSUNG ELECTRONICS CO., LTD., Suwon-si (KR)

(72) Inventors: Jongin Lee, Suwon-si (KR); Bokyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 17/984,097

(22) Filed: Nov. 9, 2022

(65) Prior Publication Data

US 2023/0147882 A1 May 11, 2023

(30) Foreign Application Priority Data

Nov. 9, 2021 (KR) .................. 10-2021-0153376
Jul. 1, 2022 (KR) .................. 10-2022-0081505

(51) Int. Cl.
*G06F 3/06* (2006.01)

(52) U.S. Cl.
CPC .......... *G06F 3/0656* (2013.01); *G06F 3/0604* (2013.01); *G06F 3/0631* (2013.01); *G06F 3/0659* (2013.01); *G06F 3/0679* (2013.01)

(58) Field of Classification Search
CPC .... G06F 3/0656; G06F 3/0604; G06F 3/0631; G06F 3/0659; G06F 3/0679; G06F 3/0613; G06F 13/1673; G06F 3/0629
See application file for complete search history.

(56) References Cited

U.S. PATENT DOCUMENTS

| 8,918,580 B2 | 12/2014 | Cheon |
| 9,304,911 B2 | 4/2016 | Choi |
| 9,817,767 B2 | 11/2017 | Lee et al. |

(Continued)

FOREIGN PATENT DOCUMENTS

| KR | 10-2014-0067400 A | 6/2014 |
| KR | 10-2016-0148948 A | 12/2016 |

(Continued)

OTHER PUBLICATIONS

Communication dated Apr. 17, 2023, issued by the Korean Intellectual Property Office in Korean Patent Application No. 10-2022-0081505.

(Continued)

*Primary Examiner* — Nanci N Wong
(74) *Attorney, Agent, or Firm* — Sughrue Mion, PLLC

(57) ABSTRACT

A memory system includes a memory controller configured to control a memory device and sub-buffer memory arranged outside the memory controller. The memory controller includes a processor configured to control a memory operation for the memory device, main buffer memory that is different from the sub-buffer memory and arranged in the memory controller, and a buffer allocation circuit configured to control an allocation ratio between the sub-buffer memory and the main buffer memory. The processor sets an operation mode of the buffer allocation circuit as an operation in which the allocation ratio is fixed.

18 Claims, 11 Drawing Sheets

(56) References Cited

U.S. PATENT DOCUMENTS

| | | |
|---|---|---|
| 10,466,908 B2 | 11/2019 | Harasawa et al. |
| 10,564,872 B2 | 2/2020 | Benisty |
| 10,956,060 B2 | 3/2021 | Lee et al. |
| 11,119,693 B2 | 9/2021 | Ahn et al. |
| 11,188,250 B2 | 11/2021 | Springberg et al. |
| 11,652,691 B1* | 5/2023 | Ramalingam ....... H04L 43/0888 709/221 |
| 2014/0032820 A1 | 1/2014 | Harasawa et al. |
| 2014/0149646 A1 | 5/2014 | Im |
| 2015/0134886 A1* | 5/2015 | Kim ..................... G06F 3/0656 711/173 |
| 2016/0026406 A1 | 1/2016 | Hahn et al. |
| 2016/0154750 A1* | 6/2016 | Park ....................... G06F 3/061 711/153 |
| 2016/0371025 A1 | 12/2016 | Park et al. |
| 2018/0081594 A1 | 3/2018 | Jung et al. |
| 2019/0121558 A1* | 4/2019 | Lee ...................... G06F 3/0679 |
| 2020/0050366 A1* | 2/2020 | Bavishi ................ G06F 3/0656 |
| 2020/0133563 A1* | 4/2020 | Springberg .......... G06F 11/1068 |
| 2021/0406187 A1* | 12/2021 | Jean .................... G06F 12/0871 |
| 2022/0413753 A1* | 12/2022 | Lee ....................... G06F 3/0673 |

FOREIGN PATENT DOCUMENTS

| | | |
|---|---|---|
| KR | 10-2018-0031289 A | 3/2018 |
| KR | 10-2019-0043868 A | 4/2019 |
| KR | 10-2002921 B1 | 7/2019 |
| KR | 10-2021-0013845 A | 2/2021 |
| KR | 10-2021-0059790 A | 5/2021 |

OTHER PUBLICATIONS

Communication dated Mar. 16, 2023, issued by the European Patent Office in counterpart European Application No. 22206508.8.

Communication dated Jul. 7, 2023, issued by the Korean Patent Office in counterpart Korean Application No. 10-2022-0081505.

* cited by examiner

MEMORY CONTROLLER FOR CONTROLLING ALLOCATION RATIO OF BUFFER MEMORY, MEMORY SYSTEM INCLUDING THE SAME, AND METHOD OF OPERATING MEMORY CONTROLLER

CROSS-REFERENCE TO RELATED APPLICATIONS

This application is based on and claims priority under 35 U.S.C. § 119 to Korean Patent Application Nos. 10-2021-0153376 and 10-2022-0081505, filed on Nov. 9, 2021 and Jul. 1, 2022, respectively, in the Korean Intellectual Property Office, the disclosures of each of which being incorporated by reference herein in their entireties.

BACKGROUND

The present disclosure relates to a memory controller, and more particularly, to a memory controller controlling an allocation ratio of buffer memory, a memory system including the same, and an operating method of the memory controller.

As a non-volatile memory, a flash memory may maintain stored data although power is cut off. A storage device including NAND flash memory of a solid state disk (SSD) is useful to store or move a large amount of data.

By increasing a bandwidth through parallel processing between a host and the NAND flash memory, the performance of the SSD may be improved. At this time, a buffer memory is used to compensate for a performance difference between the host and the NAND flash memory. For high-speed performance, a static random access memory (SRAM) is used as the buffer memory. With the development of technology, a chip size is gradually reduced. However, as the required performance of the storage device increases, a role of the buffer memory may not be performed only by the SRAM and a dynamic RAM (DRAM) may additionally be introduced. Accordingly, a method of efficiently and simultaneously using the DRAM and the SRAM as the buffer memory is required.

SUMMARY

It is an aspect to provide a memory controller that controls an allocation ratio among heterogeneous buffer memory components, a memory system including the same, and an operating method of the memory controller.

According to an aspect of one or more embodiments, there is provided a memory system including a memory controller configured to control a memory device and a sub-buffer memory arranged outside the memory controller. The memory controller includes a processor configured to control a memory operation for the memory device, a main buffer memory that is different from the sub-buffer memory and arranged in the memory controller, and a buffer allocation circuit configured to control an allocation ratio between the sub-buffer memory and the main buffer memory. The processor sets an operation mode of the buffer allocation circuit and the buffer allocation circuit controls the allocation ratio based on the operation mode.

According to another aspect of one or more embodiments, there is provided a memory system including a memory controller configured to control a memory device and a sub-buffer memory arranged outside the memory controller. The memory controller includes a processor configured to control a memory operation for the memory device, a main buffer memory that is different from the sub-buffer memory and arranged in the memory controller, and a buffer allocation circuit configured to control an allocation ratio between the sub-buffer memory and the main buffer memory. The processor sets the buffer allocation circuit to an operation mode in which the buffer allocation circuit variably sets the allocation ratio.

According to yet another aspect of one or more embodiments, there is provided a method including receiving a command from a host, determining an operation mode of a buffer allocation circuit in a memory controller as one of a first operation mode and a second operation mode, when the buffer allocation circuit is in the first operation mode, setting an allocation ratio between a main buffer memory arranged in the memory controller and a sub-buffer memory arranged outside the memory controller to a predefined ratio; and when the buffer allocation circuit is in the second operation mode, variably setting the allocation ratio based on a type of the command.

BRIEF DESCRIPTION OF THE DRAWINGS

Embodiments will be more clearly understood from the following detailed description taken in conjunction with the accompanying drawings in which.

DETAILED DESCRIPTION

Hereinafter, various embodiments will be described in detail with reference to the accompanying drawings.

Figure 1:
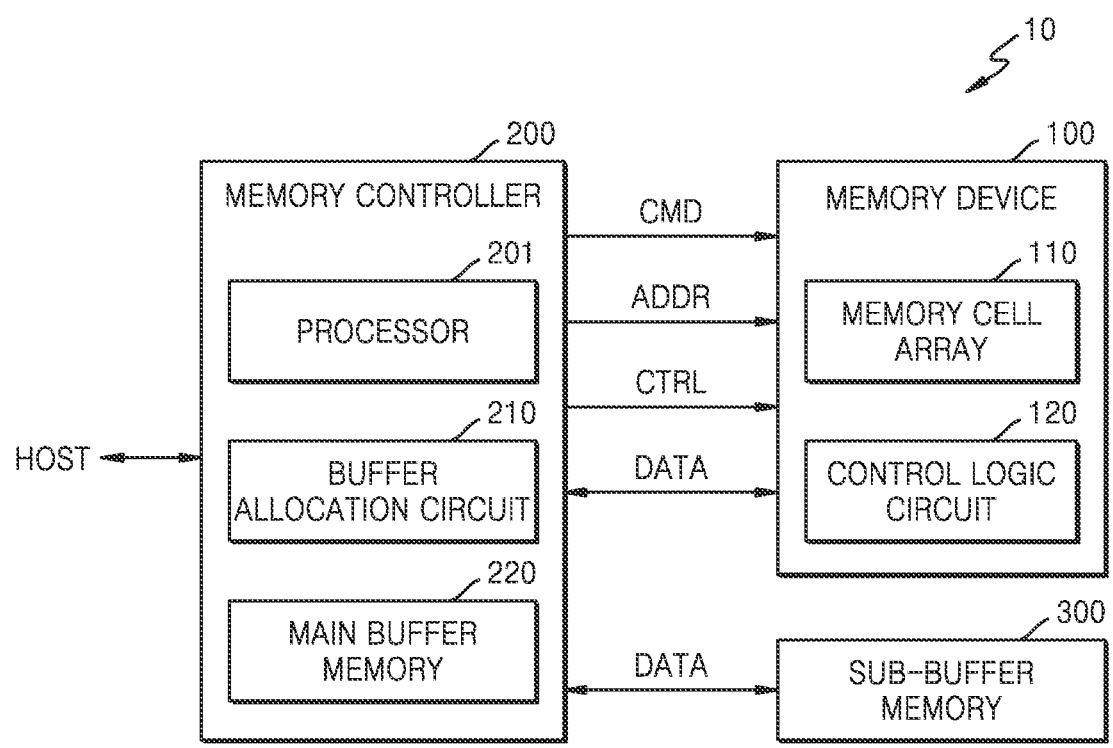
FIG. 1 is a block diagram illustrating a memory system according to an embodiment.

FIG. 1 is a block diagram illustrating a memory system 10 according to an embodiment.

Referring to FIG. 1, the memory system 10 may include a memory device 100, a memory controller 200, and sub-buffer memory 300. The memory system 10 may communicate with a host HOST through various interfaces, such as a universal serial bus (USB), a multimedia card (MMC), an embedded MMC (eMMC), a peripheral component interconnection (PCI), a PCI-express (PCI-E), an advanced technology attachment (ATA), a serial-ATA, a parallel-ATA, a small computer small interface (SCSI), an enhanced small disk interface (ESDI), integrated drive electronics (IDE), firewire, a universal flash storage (UFS), a non-volatile memory express (NVMe), and/or a compute Express Link™ (CXL).

In some embodiments, the memory system 10 may include memory that may be mounted in or detached from an electronic device in one of various forms, for example, an embedded universal flash storage (UFS) memory device, an embedded multimedia card (eMMC), a solid state drive (SSD), a UFS memory card, a compact flash (CF) card, a secure digital (SD) card, a micro-SD card, a mini-SD card, an extreme digital (xD) card, or a memory stick. In addition, the memory system 10 may be referred to as a storage device that stores data to be non-volatile.

According to various embodiments, the memory device 100 may include a memory cell array 110 and a control logic circuit 120. The memory cell array 110 may include a plurality of memory cells. For example, the plurality of memory cells may respectively include flash memory cells. Hereinafter, some embodiments are described in detail taking a case in which the plurality of memory cells respectively include NAND flash memory cells as an example. However, embodiments are not limited thereto. In some embodiments, the plurality of memory cells may include resistive memory cells, such as resistive random access memory (ReRAM) memory cells, phase change RAM (PRAM) memory cells, or magnetic RAM (MRAM) memory cells. In an embodiment, the memory cell array 110 may include a three-dimensional memory cell array. The three-dimensional memory cell array may include a plurality of NAND strings, and each of the plurality of NAND strings may include memory cells respectively connected to word lines perpendicularly stacked on a substrate. However, embodiments are not limited thereto. In some embodiments, the memory cell array 110 may include a two-dimensional memory cell array, and the two-dimensional memory cell array may include the plurality of NAND strings arranged in rows and columns.

The control logic circuit 120 may control all operations of the memory device 100. For example, the control logic circuit 120 may output various internal control signals for programming data in the memory cell array 110 or reading data from the memory cell array 110, based on a command CMD, an address ADDR, and a control signal CTRL received from the memory controller 200.

According to various embodiments, the memory controller 200 may include a processor 201, a buffer allocation circuit 210, and main buffer memory 220.

The memory controller 200 may control the memory device 100 to read the data stored in the memory cell array 110 of the memory device 100 or to write the data in the memory cell array 110 of the memory device 100, in response to a record/read request from the host HOST. For example, the memory controller 200 may include the processor 201 that may control all operations in the memory controller 200. In some embodiments, the processor 201 may be a central processing unit (CPU), a microprocessor, a microcontroller, or hardware control logic. In some embodiments, plural processors 201 may be provided. The processor 201 may control a memory operation of the memory device 100. Specifically, the memory controller 200 may provide the address ADDR, the command CMD, and the control signal CTRL to the memory device 100 to control write, read, and erase operations of the memory device 100. For example, the memory controller 200 may provide a sequential write command or a random write command for recording the data in the memory device 100 to the memory device 100. As another example, the memory controller 200 may provide a sequential read command or a random read command for reading the data stored in the memory device 100 to the memory device 100.

According to an embodiment, the memory controller 200 may further include a buffer allocation circuit 210 and main buffer memory 220. The main buffer memory 220 as buffer memory mounted in the memory controller 200 may be referred to as internal buffer memory. According to an embodiment, the main buffer memory 220 may include SRAM for a high speed operation. Because the main buffer memory 220 is mounted in the memory controller 200, a gate count value of a chip of the memory controller 200 may increase. The sub-buffer memory 300 arranged outside the memory controller 200 may be referred to as an external buffer memory. According to an embodiment, the sub-buffer memory 300 may include DRAM.

The buffer allocation circuit 210 may control an allocation ratio between the main buffer memory 220 and the sub-buffer memory 300. The allocation ratio may be expressed in the form: [main buffer memory]:[sub-buffer memory]. According to an embodiment, the buffer allocation circuit 210 may control the allocation ratio based on a kind of a command received by the memory controller 200 from the host HOST. For example, the memory controller 200 may receive the sequential write command from the host HOST. The buffer allocation circuit 210 may request the main buffer memory 220 and the sub-buffer memory 300 to allocate a buffer based on a predefined first ratio, in response to the received sequential write command. The predefined first ratio may be expressed in the form: main buffer memory: sub-buffer memory and may be, for example, 5:5. As another example, the memory controller 200 may receive one of the random write command, the sequential read command, and the random read command from the host HOST. The buffer allocation circuit 210 may request only the sub-buffer memory 300 to allocate a buffer based on a predefined second ratio in response to the received command. That is, the predefined second ratio may be, for example, 0:10, or the predefined second ratio may be 1:9.

According to another embodiment, the buffer allocation circuit 210 may control the allocation ratio between the main buffer memory 220 and the sub-buffer memory 300 based on a monitoring result value of the memory controller 200. For example, the buffer allocation circuit 210 may further include a monitoring circuit for tracking a command processing speed of the memory controller 200. The buffer allocation circuit 210 may receive the monitoring result value from the monitoring circuit and, when the monitoring result value is less than a threshold value, may control the allocation ratio of the main buffer memory 220 to increase in order to increase the command processing speed, as described below in detail.

Figure 2:
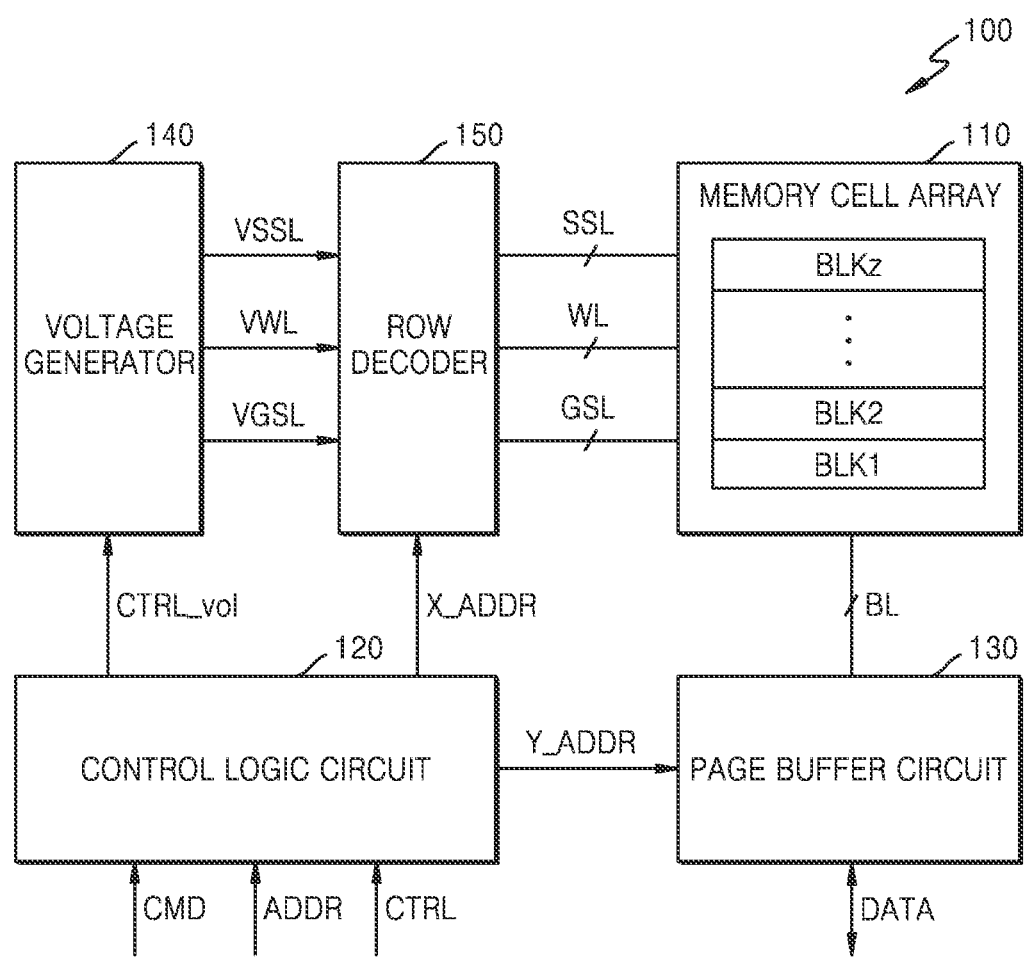
FIG. 2 is a block diagram illustrating a memory device according to an embodiment.

FIG. 2 is a block diagram illustrating the memory device 100 according to an embodiment.

Referring to FIGS. 1 and 2, the memory device 100 may further include a page buffer circuit 130, a voltage generator 140, and a row decoder 150 in addition to the memory cell array 110 and the control logic circuit 120. Although not shown, the memory device 100 may further include an interface circuit, and the interface circuit may include a data input/output circuit and a command/address input/output circuit.

The memory cell array 110 may include a plurality of memory blocks BLK1 to BLKz, where z is a positive integer. Each of the plurality of memory blocks BLK1 to BLKz may include a plurality of pages, each of which may include a plurality of memory cells. For example, a memory block may be an erase unit and a page may be a write and read unit. Each of the plurality of memory cells may store one or more bits. Specifically, each of the plurality of memory cells may be used as a single level cell (SLC), a multilevel cell (MLC), a triple level cell (TLC), or a quadruple level cell (QLC).

The memory cell array 110 may be connected to a plurality of word lines WL, a plurality of string selection lines SSL, a plurality of ground selection lines GSL, and a plurality of bit lines BL. The memory cell array 110 may be connected to the row decoder 150 through the plurality of word lines WL, the plurality of string selection lines SSL, and the plurality of ground selection lines GSL and may be connected to the page buffer circuit 130 through the plurality of bit lines BL. In some embodiments, the memory cell array 110 may be further connected to gate induced drain leakage (GIDL) erase control lines.

In an embodiment, the memory cell array 110 may include a three-dimensional memory cell array, and the three-dimensional memory cell array may include a plurality of cell strings or NAND strings. Each of the plurality of cell strings may include a plurality of memory cells respectively connected to the plurality of word lines perpendicularly stacked on a substrate. U.S. Pat. Nos. 7,679,133; 8,553,466; 8,654,587; 8,559,235; and 2011/0233648 describe various aspects of exemplary three-dimensional memory devices and are incorporated by reference herein in their entireties.

The control logic circuit 120 may output various control signals for writing data in the memory cell array 110 or reading data from the memory cell array 110, based on the command CMD, the address ADDR, and the control signal CTRL received from the memory controller 200. The control logic circuit 120 may control all operations in the memory device 100. Specifically, the control logic circuit 120 may provide a voltage control signal CTRL_vol to the voltage generator 140, may provide a row address X_ADDR to the row decoder 150, and may provide a column address Y_ADDR to the page buffer circuit 130. However, embodiments are not limited thereto, and the control logic circuit 120 may further provide other control signals to the voltage generator 140, the row decoder 150, and the page buffer circuit 130.

The voltage generator 140 may generate various kinds of voltages for performing program, read, and erase operations based on the voltage control signal CTRL_vol. Specifically, the voltage generator 140 may generate a word line voltage VWL, a string selection line voltage VSSL, and a ground selection line voltage VGSL and may provide the word line voltage VWL, the string selection line voltage VSSL, and the ground selection line voltage VGSL to the row decoder 150. For example, the voltage generator 140 may generate a program voltage, a pass voltage, a read voltage, a program verification voltage, or an erase voltage as the word line voltage VWL. In addition, the voltage generator 140 may further generate a bit line voltage and a common source line voltage.

The row decoder 150 may select one of the plurality of word lines WL and one of the plurality of string selection lines SSL in response to the row address X_ADDR. For example, during the program operation, the row decoder 150 may apply the program voltage to a selection word line in a program execution section and may apply the program verification voltage to the selection word line in a program verification section. The page buffer circuit 130 may select at least one of the plurality of bit lines BL in response to the column address Y_ADDR. The page buffer circuit 130 may operate as a write driver or a sense amplifier in accordance with an operation mode.

Figure 3:
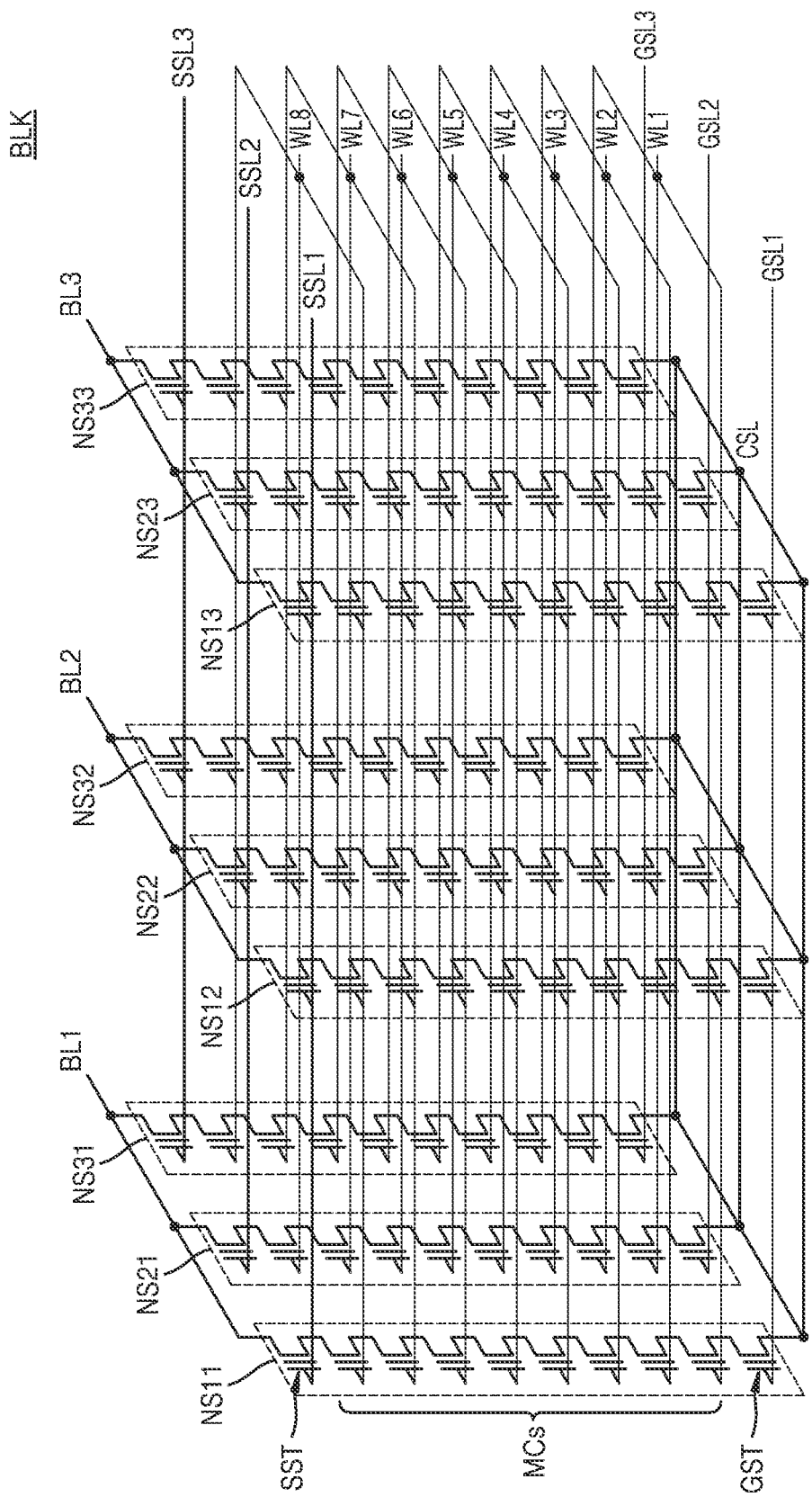
FIG. 3 is a circuit diagram illustrating a memory block according to an embodiment.

FIG. 3 is a circuit diagram illustrating a memory block BLK according to an embodiment.

Referring to FIG. 3, the memory block BLK may correspond to one of the plurality of memory blocks BLK1 to BLKz of FIG. 2. The memory block BLK may include NAND strings or cell strings NS11 to NS33 that may be connected to bit lines BL1 to BL3, string selection lines SSL1 to SSL3, word lines WL1 to WL8, and ground selection lines GSL1 to GSL3 and extend in a vertical direction VD, respectively. Here, the number of cell strings, the number of word lines, the number of bit lines, the number of ground selection lines, and the number of string selection lines may vary in accordance with an embodiment.

The bit lines BL1 to BL3 may extend in a first direction or a first horizontal direction HD1, and the word lines WL1 to WL8 may extend in a second direction or a second horizontal direction HD2. The cell strings NS11, NS21, and NS31 may be between the first bit line BL1 and a common source line CSL, the cell strings NS12, NS22, and NS32 may be between the second bit line BL2 and the common source line CSL, and the cell strings NS13, NS23, and NS33 may be between the third bit line BL3 and the common source line CSL.

For example, the cell string NS11 may include a string selection transistor SST, a plurality of memory cells MCs, and a ground selection transistor GST that are serially connected to one another. The string selection transistor SST may be connected to the string selection line SSL1, and the memory cells MCs may be respectively connected to the word lines WL1 to WL8. The ground selection transistor GST may be connected to the ground selection line GSL1.

In some embodiments, the memory block BLK may further include upper GIDL erase control lines between the bit lines BL1 to BL3 and the string selection lines SSL1 to SSL3, and each cell string may further include at least one upper GIDL erase control transistor connected to at least one upper GIDL erase control line. In some embodiments, the memory block BLK may further include lower GIDL erase control lines between the ground selection lines GSL1 to GSL3 and the common source line CSL, and each cell string may further include at least one lower GIDL erase control transistor connected to at least one lower GIDL erase control line.

Figure 4:
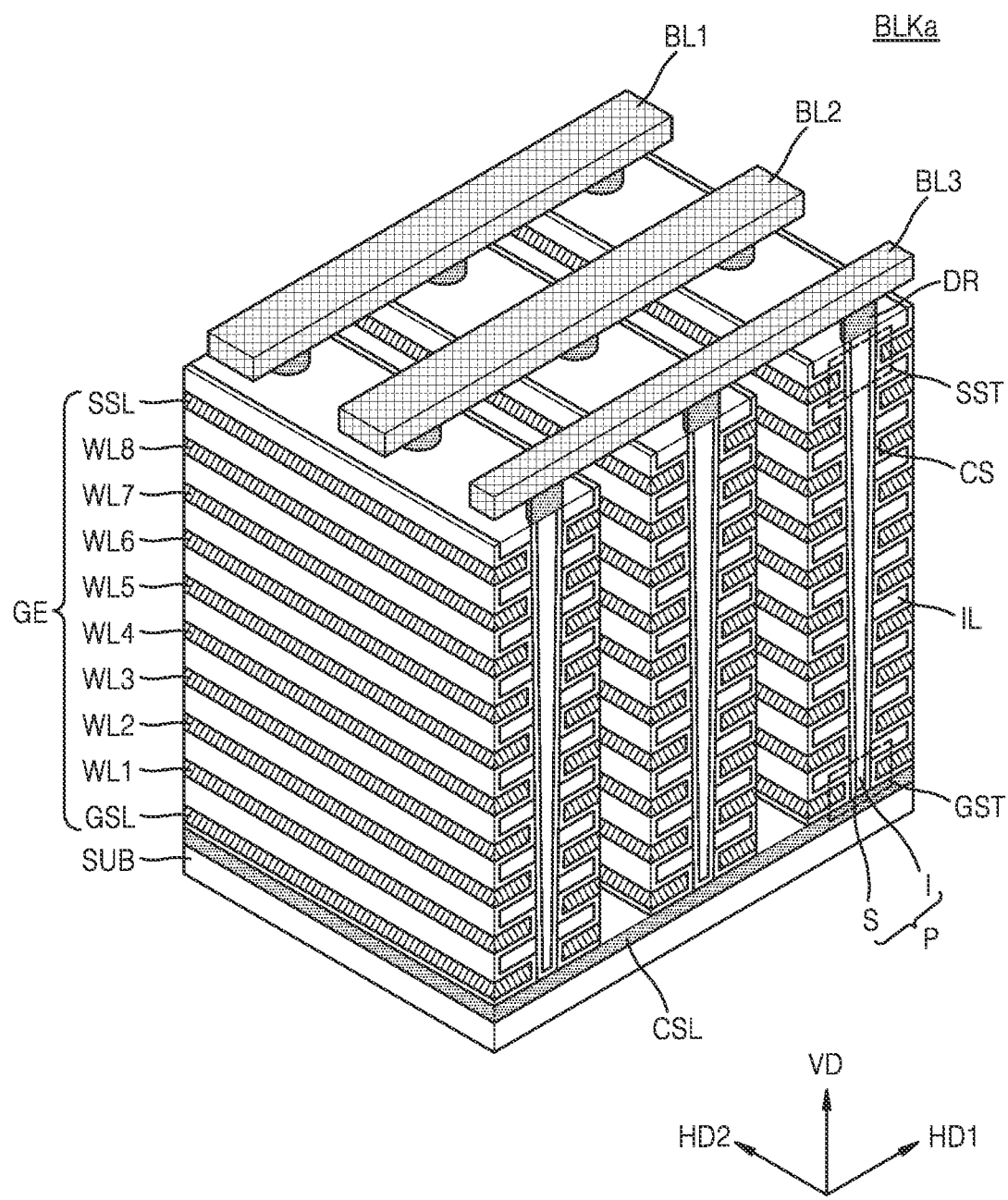
FIG. 4 is a perspective view illustrating a memory block according to an embodiment.

FIG. 4 is a perspective view illustrating a memory block BLKa according to an embodiment.

Referring to FIG. 4, the memory block BLKa may correspond to one of the plurality of memory blocks BLK1 to BLKz of FIG. 2. The memory block BLKa is formed perpendicular to a substrate SUB.

The substrate SUB has a first conductive type (for example, p type) and extends on the substrate SUB in the second horizontal direction HD2. In an embodiment, a common source line CSL doped with a second conductive type (for example, n type) impurities may be provided to the substrate SUB. In an embodiment, the substrate SUB may include polysilicon and the flat-plate common source line CSL may be arranged on the substrate SUB. On the substrate SUB, a plurality of insulating layers IL extending in the second horizontal direction HD2 are sequentially provided in the vertical direction VD and are apart from one another in the vertical direction VD. For example, the plurality of insulating layers IL may include an insulating material, such as silicon oxide.

On the substrate SUB, a plurality of pillars P sequentially arranged in the first horizontal direction HD1 and passing through the plurality of insulating layers IL in the vertical direction VD are provided. For example, the plurality of pillars P pass through the plurality of insulating layers IL and contact the substrate SUB. Specifically, a surface layer S of each of the plurality of pillars P may include a silicon material having a first type and may function as a channel region. Accordingly, in some embodiments, each of the plurality of pillars P may be referred to as a channel structure or a vertical channel structure. On the other hand, an internal layer I of each of the plurality of pillars P may include an insulating material, such as silicon oxide or an air gap.

A charge storage layer CS is provided along exposed surfaces of the plurality of insulating layers IL, the plurality of pillars P, and the substrate SUB. The charge storage layer CS may include a gate insulating layer (or referred to as a 'tunneling insulating layer'), a charge trap layer, and a blocking insulating layer. For example, the charge storage layer CS may have an oxide-nitride-oxide (ONO) structure. In addition, on the exposed surface of the charge storage layer CS, gate electrodes GE, such as ground selection lines GSL, word lines WL1 to WL8, and string selection lines SSL, are provided. The numbers of ground selection lines GSL, word lines WL1 to WL8, and string selection lines SSL may vary according to an embodiment.

On the plurality of pillars P, drain contacts or drains DR are respectively provided. For example, the drains DR may include a silicon material doped with second conductive type impurities. On the drains DR, the bit lines BL1 to BL3 extending in the first horizontal direction HD1 and apart from one another by a certain distance in the second horizontal direction HD2 are provided.

Figure 5:
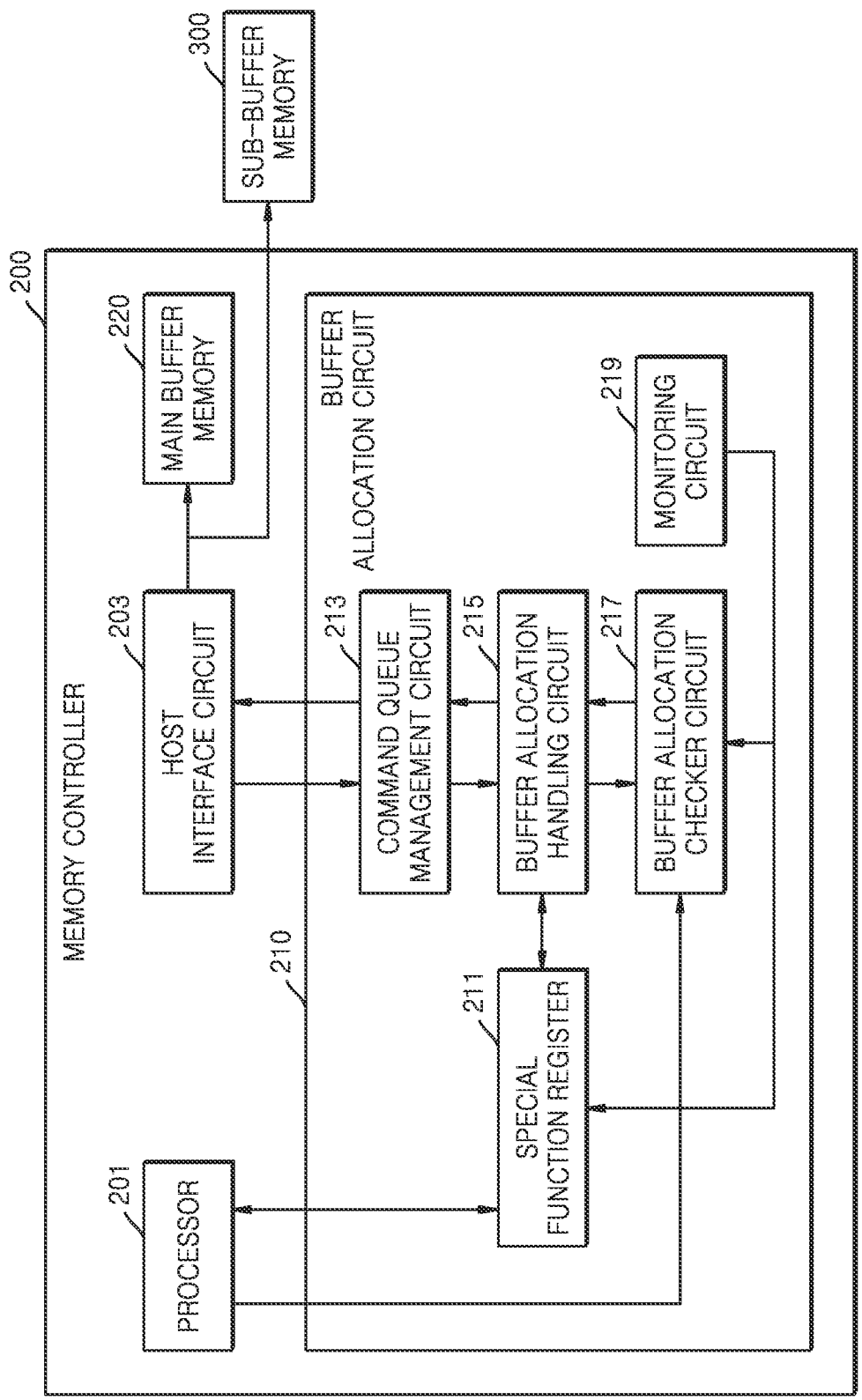
FIG. 5 is a block diagram illustrating a memory controller according to an embodiment.

FIG. 5 is a block diagram illustrating the memory controller 200 according to an embodiment.

Referring to FIG. 5, the memory controller 200 may include the processor 201, a host interface circuit 203, the buffer allocation circuit 210, and the main buffer memory 220, and the host interface circuit 203 may be connected to the main buffer memory 220 arranged inside the memory controller 200 and to the sub-buffer memory 300 arranged outside the memory controller 200.

The host interface circuit 203 may perform interfacing between the host HOST and the memory system 10. For example, the host interface circuit 203 may provide a command received from the host HOST to the buffer allocation circuit 210. Specifically, the host interface circuit 203 may provide the command to a command queue management circuit 213 of the buffer allocation circuit 210 so that received commands are sequentially processed. For example, the host interface circuit 203 may request buffer memory to be allocated and released. The host interface circuit 203 may request the buffer allocation circuit 210 to allocate a buffer to the main buffer memory 220 and the sub-buffer memory 300 as the buffer memory. The host interface circuit 203 may receive an operation done response from the buffer allocation circuit 210, and may request the buffer allocation circuit 210 to release the allocated buffer memory.

According to various embodiments, the buffer allocation circuit 210 may include a special function register 211, the command queue management circuit 213, a buffer allocation handling circuit 215, a buffer allocation checker circuit 217, and a monitoring circuit 219.

The special function register 211 may store set values of the buffer allocation circuit 210. For example, the special function register 211 may store values corresponding to a plurality of ratios. The processor 201 may provide a control signal to the special function register 211 to control an allocation ratio between the main buffer memory 220 and sub-buffer memory 300 based on a value representing one of the plurality of ratios. More specifically, the special function register 211 may receive the control signal from the processor 201 and may determine an allocation ratio represented by the received control signal or corresponding to the control signal. The special function register 211 may provide the identified allocation ratio to the buffer allocation handling circuit 215. The buffer allocation handling circuit 215 may return a buffer pointer value representing a starting point at which a write operation is to be performed on each of the main buffer memory 220 and sub-buffer memory 300 to the host interface circuit 203 based on the allocation ratio. When the processor 201 provides the control signal to the special function register 211, the buffer allocation checker circuit 217 may be deactivated.

The special function register 211 may return a monitoring result to the processor 201. The monitoring result may be a value obtained by digitizing the performance of the memory system 10. For example, the performance may be a size of the buffer memory allocated per unit time. The processor 201 may provide the control signal representing a time interval for monitoring to the special function register 211. The special function register 211 may receive the monitoring result from the monitoring circuit 219 and may store the received monitoring result at each time interval based on the control signal. The special function register 211 may receive a performance check request of the processor 201, and may provide the monitoring result to the processor 201 in response to the performance check request. According to an embodiment, the processor 201 may return the control signal changing the allocation ratio based on the monitoring result to the special function register 211.

The command queue management circuit 213 may store and manage the commands received from the host HOST. For example, the command queue management circuit 213 may store unprocessed commands among a plurality of commands received from the host interface circuit 203 in the order received. For example, the command queue management circuit 213 may manage a command queue so that the plurality of commands may be executed in accordance with first in first out (FIFO).

The buffer allocation checker circuit 217 may be activated or deactivated based on an operation mode of the memory controller 200. For example, the memory controller 200 may operate in the first operation mode. In the first operation mode, the buffer memory may be allocated in accordance with a preset ratio regardless of the monitoring result. The first operation mode may be referred to as one of various terms including a fixed mode, a deterministic mode, and an immutable mode. That is, when the operation mode of the memory controller 200 is the first operation mode, the allocation ratio between the main buffer memory 220 and the sub-buffer memory 300 may be determined in accordance with the ratio designated by the processor 201 through the special function register 211. In some embodiments, while the memory controller 200 operates in the first operation mode, although a performance result value output from the monitoring circuit 219 is lowered in real time, the preset ratio may not change. The buffer allocation checker circuit 217 may be deactivated while the memory controller 200 operates in the first operation mode. For example, the processor 201 may set the operation mode of the memory controller 200 as the first operation mode, and may provide an inactive (or disable) signal to the buffer allocation checker circuit 217 in response to the first operation mode. The buffer allocation checker circuit 217 may enter an inactive state or an idle state in response to the signal.

For example, the memory controller 200 may operate in the second operation mode. In the second operation mode, a ratio in which the buffer memory is allocated may change in accordance with the monitoring result. The second operation mode may be referred to as one of various terms including a floating mode, a flexible mode, and an adaptive mode. For example, the processor 201 may set the operation mode of the memory controller 200 as the second operation mode, and may provide an active (or enable) signal to the buffer allocation checker circuit 217 in response to the second operation mode. The buffer allocation checker circuit 217 may enter an active state in response to the signal. The buffer allocation checker circuit 217 may enter the active state and may receive the performance result value from the monitoring circuit 219. When the performance result value is less than the threshold value, the buffer allocation checker circuit 217 may change the allocation ratio between the main buffer memory 220 and the sub-buffer memory 300 in order to improve the performance of the memory system 10.

According to an embodiment, the processor 201 may change the operation mode in response to a trigger event. For example, the processor 201 may always operate in the first operation mode during initial operation. The processor 201 may request the performance result value at each time interval. In some embodiments, the time interval may be predefined or preset. The processor 201 may determine that the performance result value is less than a threshold value for the trigger event. When the performance result value is less than the threshold value, the processor 201 may change the operation mode of the memory controller 200 from the first operation mode to the second operation mode in order to improve the performance of the memory system 10. For example, the processor 201 may provide the enable signal to the buffer allocation checker circuit 217 when the performance result value is less than the threshold value for the trigger event.

Figure 6:
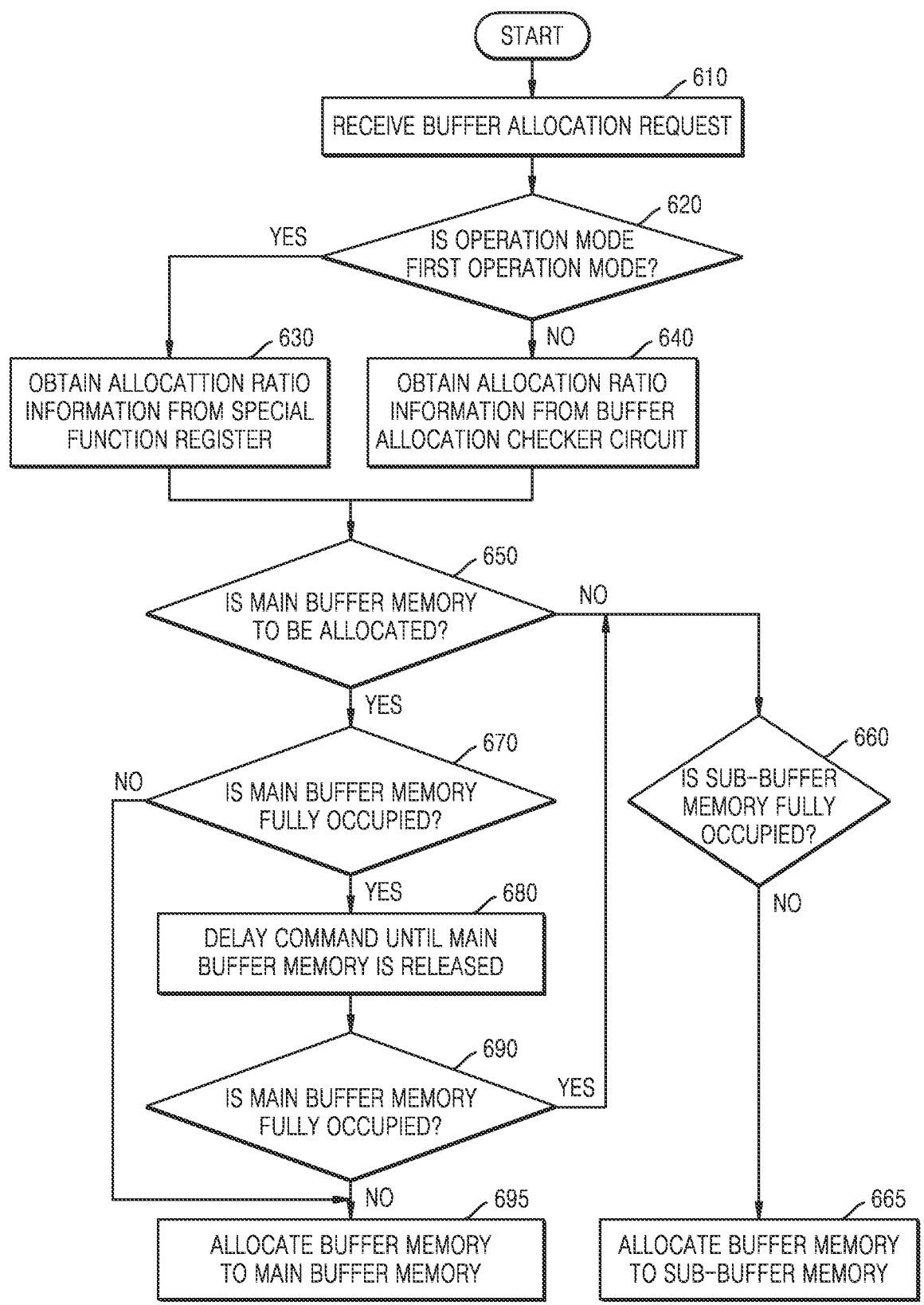
FIG. 6 is a flowchart illustrating an operation of a buffer allocation handling circuit according to an embodiment.

FIG. 6 is a flowchart illustrating an operation of the buffer allocation handling circuit 215 according to an embodiment.

Referring to FIG. 6, in operation 610, the buffer allocation handling circuit 215 may receive an allocation request. In response to a command received from the host HOST, the host interface circuit 203 may transmit the received command to the command queue management circuit 213 of the buffer allocation circuit 210. The command queue management circuit 213 may receive the command received by the host interface circuit 203 and may calculate a buffer size required for processing the command to transmit the allocation request to the buffer allocation handling circuit 215. For example, the command queue management circuit 213 may request buffer memory of (M+N).

In operation 620, the buffer allocation handling circuit 215 may determine whether the operation mode of the memory controller 200 is the first operation mode. For example, the memory controller 200 may operate in one of the first operation mode in which the buffer allocation checker circuit 217 in the buffer allocation circuit 210 is deactivated and the second operation mode in which the buffer allocation checker circuit 217 in the buffer allocation circuit 210 is activated. The buffer allocation handling circuit 215 may transmit a request to determine the operation mode to the special function register 211 or may transmit a state request to the buffer allocation checker circuit 217 to determine the operation mode.

When the operation mode is the first operation mode (operation 620, YES), in operation 630, the buffer allocation handling circuit 215 may obtain information on the allocation ratio between the main buffer memory 220 and the sub-buffer memory 300 from the special function register 211. In other words, when the operation mode determined in operation 620 is the first operation mode, a fixed allocation ratio must be obtained. Therefore, the buffer allocation handling circuit 215 may request the special function register 211 for the allocation ratio information and may obtain the allocation ratio information representing a ratio set by the processor 201.

When the operation mode is not the first operation mode (operation 620, NO), in operation 640, the buffer allocation handling circuit 215 may obtain the information on the allocation ratio between the main buffer memory 220 and the sub-buffer memory 300 from the buffer allocation checker circuit 217. In other words, when the operation mode determined in operation 620 is the second operation mode, the allocation ratio may vary depending on the performance result value output from the monitoring circuit 219. Therefore, the buffer allocation handling circuit 215 may obtain the allocation ratio information by requesting the buffer allocation checker circuit 217 for the allocation ratio between the main buffer memory 220 and the sub-buffer memory 300.

In operation 650, the buffer allocation handling circuit 215 may determine whether the main buffer memory 220 is to be allocated. When it is determined by the buffer allocation handling circuit 215 that the main buffer memory 220 is not to be allocated (operation 650, NO), the sub-buffer memory 300 may be allocated and the process may proceed to operation 660.

In operation 660, the buffer allocation handling circuit 215 may determine whether the sub-buffer memory 300 is currently in a full occupancy state. In some embodiments, the full occupancy state may refer to a state in which all the buffer capacity allocated to the sub-buffer memory 300 is used. In some embodiments, the full occupancy state may refer to a state in which the write operation is previously performed by the size of the buffer memory allocated to the sub-buffer memory 300. The buffer allocation handling circuit 215 may request the buffer allocation checker circuit 217 for information on an occupancy state of the sub-buffer memory 300. The buffer allocation checker circuit 217 may monitor the size of previously allocated buffer memory whenever the buffer memory is allocated to the sub-buffer memory 300. Therefore, when the size of the buffer memory previously allocated to the sub-buffer memory 300 is equal to the buffer capacity of the sub-buffer memory 300, the buffer allocation checker circuit 217 may determine that the sub-buffer memory 300 is in the full occupancy state. According to an embodiment, the buffer allocation checker circuit 217 may respond with only whether the sub-buffer memory 300 is in the full occupancy state in response to the request for the information on the occupancy state of the sub-buffer memory 300 from the buffer allocation handling circuit 215. For example, the buffer allocation checker circuit 217 may respond with one "logic high" bit when the sub-buffer memory 300 is in the full occupancy state and may respond with one "logic low" bit when the sub-buffer memory 300 is not in the full occupancy state but is in a partial occupancy state. According to an embodiment, the buffer allocation checker circuit 217 may also respond with a specific value of previously allocated buffer capacity of the sub-buffer memory 300. In this case, a signal that the buffer allocation checker circuit 217 responds with the buffer allocation handling circuit 215 may include a plurality of bits. The buffer allocation handling circuit 215 may receive the information on the occupancy state of the sub-buffer memory 300 from the buffer allocation checker circuit 217.

When the sub-buffer memory 300 is not in the full occupancy state (operation 660, NO), because buffer capacity by which the write operation may be performed remains in the buffer capacity allocated to the sub-buffer memory 300, the buffer memory may be allocated to the sub-buffer memory 300 in operation 665. For example, the buffer allocation handling circuit 215 may generate a buffer pointer representing a position in which the write operation starts in the sub-buffer memory 300. The host interface circuit 203 may receive the buffer pointer through the command queue management circuit 213 and may control the write operation to be performed from the address of the sub-buffer memory 300 represented by the buffer pointer. According to various embodiments, the buffer allocation handling circuit 215 may receive information representing that the sub-buffer memory 300 is in the full occupancy state from the host interface circuit 203 before requesting the buffer allocation checker circuit 217 for the information on the occupancy state of the sub-buffer memory 300. For example, the sub-buffer memory 300 may transmit an occupancy flag to the host interface circuit 203 in response to occupancy of all the buffer memory. The occupancy flag may be a flag signal representing that the buffer memory (the main buffer memory 220 or the sub-buffer memory 300) is in the full occupancy state and the buffer memory must be released. The host interface circuit 203 may provide the received occupancy flag to the buffer allocation handling circuit 215 and may represent that the sub-buffer memory 300 is in the full occupancy state.

In operation 670, the buffer allocation handling circuit 215 may determine whether the main buffer memory 220 is currently in a full occupancy state. In some embodiments, the full occupancy state may refer to a state in which all the buffer capacity allocated to the main buffer memory 220 is used. In some embodiments, the full occupancy state may refer to a state in which a write operation is previously performed by the size of the buffer memory allocated to the main buffer memory 220. The buffer allocation handling circuit 215 may request the buffer allocation checker circuit 217 for information on an occupancy state of the main buffer memory 220. The buffer allocation checker circuit 217 may monitor the size of previously allocated buffer memory whenever the buffer memory is allocated to the main buffer memory 220. Therefore, when the size of the buffer memory previously allocated to the main buffer memory 220 is equal to the buffer capacity of the main buffer memory 220, the buffer allocation checker circuit 217 may determine that the main buffer memory 220 is in the full occupancy state. According to an embodiment, the buffer allocation checker circuit 217 may respond with only whether the main buffer memory 220 is in the full occupancy state in response to the request for the information on the occupancy state of the main buffer memory 220 from the buffer allocation handling circuit 215. For example, the buffer allocation checker circuit 217 may respond with one "logic high" bit when the main buffer memory 220 is in the full occupancy state and may respond with one "logic low" bit when the main buffer memory 220 is not in the full occupancy state but is in a partial occupancy state. According to another embodiment, the buffer allocation checker circuit 217 may also respond with a specific value of previously allocated buffer capacity of the main buffer memory 220. In this case, a signal that the buffer allocation checker circuit 217 responds with the buffer allocation handling circuit 215 may include a plurality of bits. When the main buffer memory 220 is not in the full occupancy state (operation 670, NO), the buffer allocation handling circuit 215 may allocate the buffer memory to the main buffer memory 220 in operation 695. For example, the buffer allocation handling circuit 215 may generate a buffer pointer representing a position in which the write operation starts in the main buffer memory 220. The host interface circuit 203 may receive the buffer pointer through the command queue management circuit 213 and may control the write operation to be performed from the address of the main buffer memory 220 represented by the buffer pointer. According to various embodiments, the buffer allocation handling circuit 215 may receive information representing that the main buffer memory 220 is in the full occupancy state from the host interface circuit 203 before requesting the buffer allocation checker circuit 217 for the information on the occupancy state of the main buffer memory 220. For example, the main buffer memory 220 may transmit an occupancy flag to the host interface circuit 203 in response to occupancy of all the buffer memory. The occupancy flag may be a flag signal representing that the buffer memory (the main buffer memory 220 or the sub-buffer memory 300) is in the full occupancy state and the buffer memory must be released. The host interface circuit 203 may provide the received occupancy flag to the buffer allocation handling circuit 215 and may represent that the main buffer memory 220 is in the full occupancy state.

When the main buffer memory 220 is in the full occupancy state (operation 670, YES), in operation 680, the buffer allocation handling circuit 215 may delay a command until the main buffer memory 220 is released. For example, in operation 670, the main buffer memory 220 may be determined to be in the full occupancy state. In other words, because the main buffer memory 220 is in the full occupancy state in operation 670, there is no free space for allocating a buffer in the main buffer memory 220. The buffer allocation handling circuit 215 may delay a command in the command queue management circuit 213 until the main buffer memory 220 is released. According to an embodiment, the buffer allocation handling circuit 215 may delay the command by a predefined time. The pre-defined time may be longer than an average time spent on transiting the main buffer memory 220 from a non-occupancy state to the full occupancy state and releasing the main buffer memory 220. According to an embodiment, the processor 201 may delay the command by the predefined time and may allocate the delayed command to the main buffer memory 220 to improve the performance of the memory system 10. The main buffer memory 220 is implemented in the chip of the memory controller 200, and has a processing speed higher than that of the sub-buffer memory 300. Therefore, when the buffer to be allocated to the main buffer memory 220 is allocated to the sub-buffer memory 300 only because the main buffer memory 220 is in the full occupancy state, the performance of the memory system 10 may deteriorate. The performance of the memory system 10 may improve when the buffer memory is allocated to the main buffer memory 220 even though the commands in the command queue management circuit 213 are delayed by a predefined time, when considering deterioration of the performance of the memory system 10 including a physical signal delay occurring by allocating the buffer memory to the sub-buffer memory 300 outside the chip of the memory controller 200 and processing delay occurring by the sub-buffer memory 300 with a low processing speed.

In operation 690, the buffer allocation handling circuit 215 may determine whether the main buffer memory 220 is currently in a full occupancy state. The buffer allocation handling circuit 215 may request the buffer allocation confirmation circuit 217 for the information on the occupancy state of the main buffer memory 220 again in response to the lapse of the predefined time. When the main buffer memory 220 is released for the predefined time, the main buffer memory 220 may not be in the full occupancy state. When the main buffer memory 220 is not in the full occupancy state (operation 690, NO), the buffer allocation handling circuit 215 may allocate the buffer memory to the main buffer memory 220 in operation 695. For example, the buffer allocation handling circuit 215 may generate the buffer pointer representing the position in which the write operation starts in the main buffer memory 220. The host interface circuit 203 may receive the buffer pointer through the command queue management circuit 213 and may control the write operation to be performed from the address of the main buffer memory 220 represented by the buffer pointer. In one embodiment, the buffer allocation handling circuit 215 may receive a flag representing that the main buffer memory 220 is fully occupied, instruct the command queue management circuit 213 to standby for a predefined time based on the flag, and after the predefined time has elapsed and the flag has not been subsequently received, allocate a buffer to the main buffer memory 220.

According to another embodiment, after the predefined time has elapsed in operation 690, the main buffer memory 220 may still be in the full occupancy state (operation 690, YES). In this case, the buffer allocation handling circuit 215 may skip performing the write operation on the main buffer memory 220, and may perform operation 660 of performing the write operation on the sub-buffer memory 300.

Figure 7:
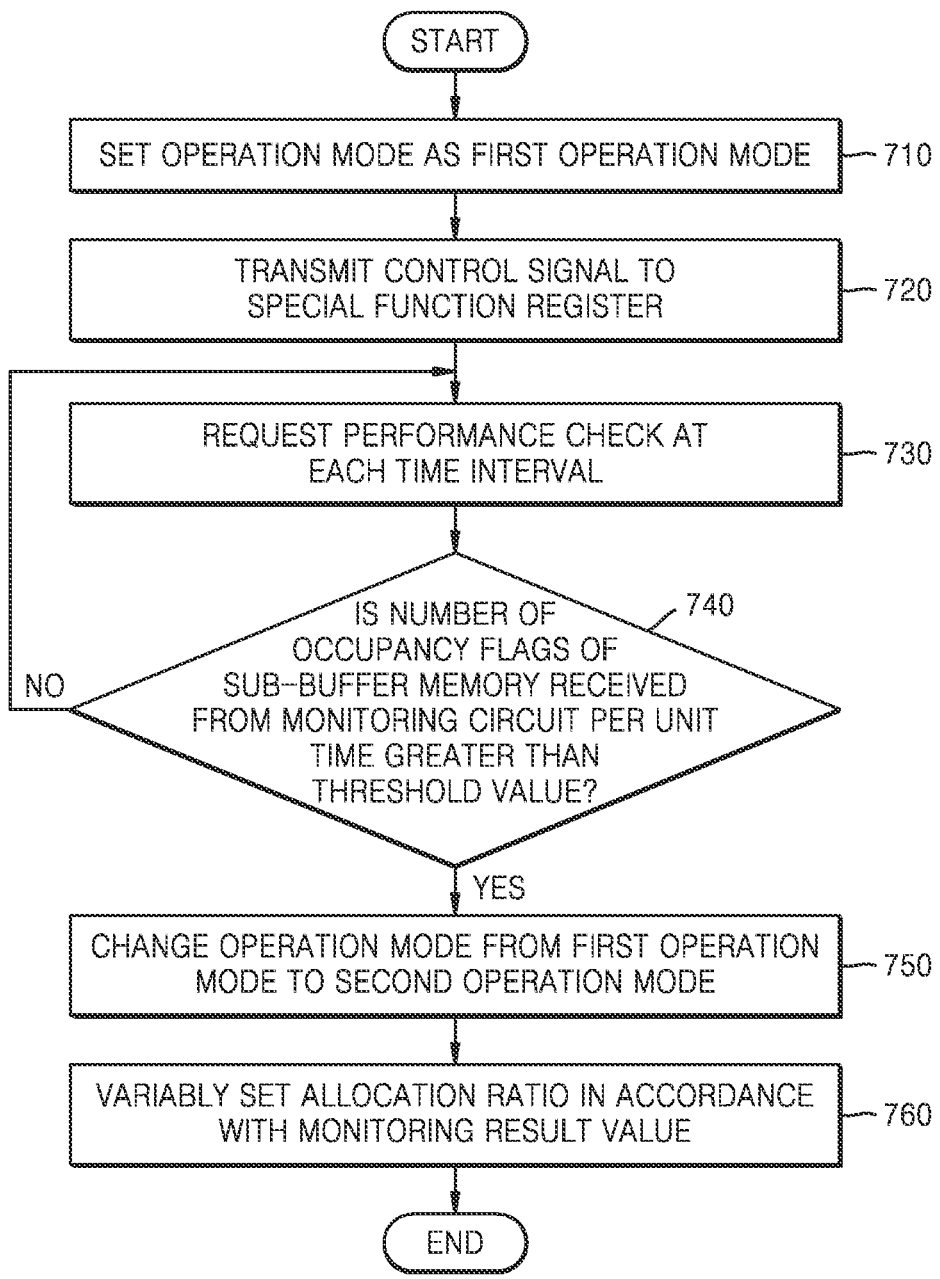
FIG. 7 is a flowchart illustrating an operation of a processor according to an embodiment.

FIG. 7 is a flowchart illustrating an operation of the processor 201 according to an embodiment.

Referring to FIG. 7, in operation 710, the processor 201 may set the operation mode of the memory controller 200 as the first operation mode. The processor 201 may set the first operation mode first during an initial operation of a process of allocating a buffer. In other words, the processor 201 may deactivate the buffer allocation checker circuit 217 by transmitting the disable signal to the buffer allocation checker circuit 217.

In operation 720, the processor 201 may transmit the control signal to the special function register 211. According to an embodiment, the control signal may be for selecting one of the plurality of allocation ratios stored in the special function register 211. For example, in some embodiments, the processor 201 may set the allocation ratio between the main buffer memory 220 and the sub-buffer memory 300 as 1:9 by providing the control signal to the special function register 211. In some embodiments, the processor 201 may directly transmit the allocation ratio information directly representing the allocation ratio to the special function register 211.

In operation 730, the processor 201 may request a performance check at each time interval. The time interval may be preset. For example, the processor 201 may transmit the performance check request to the special function register 211 at each time interval. The special function register 211 may provide the performance result value received from the monitoring circuit 219 and stored therein to the processor 201. According to another embodiment, the processor 201 may directly request the monitoring circuit 219 for a performance check at each preset time interval.

In operation 740, the processor 201 may determine whether the number of occupancy flags of the sub-buffer memory 300 received from the monitoring circuit 219 for a unit time is greater than a threshold value. The occupancy flag may be for representing that the sub-buffer memory 300 is in the full occupancy state.

When the number of occupancy flags is greater than the threshold value (operation 740, YES), in operation 750, the processor 201 may change the operation mode of the memory controller 200 from the first operation mode to the second operation mode. When the number of occupancy flags received for the unit time is greater than the threshold value, it may mean that the occupancy flags are frequently generated because commands are not rapidly processed before the allocation ratio fixed to a current preset value makes the sub-buffer memory 300 in the full occupancy state. Therefore, the processor 201 may change the first operation mode in which the memory controller 200 operates in the fixed allocation ratio to the second operation mode.

In operation 760, the processor 201 may variably set the allocation ratio in accordance with the monitoring result value. In response to the change of the operation mode of the memory controller 200 from the first operation mode to the second operation mode, the buffer allocation checker circuit 217 may be activated. The buffer allocation checker circuit 217 may monitor a remaining buffer size of the main buffer memory 220 and the sub-buffer memory 300 in real time. The buffer allocation checker circuit 217 may control the allocation ratio between the main buffer memory 220 and the sub-buffer memory 300 based on the monitoring result value and the remaining buffer size. For example, when the allocation ratio between the main buffer memory 220 and the sub-buffer memory 300 is 1:9 in the first operation mode, the buffer allocation checker circuit 217 may control the allocation ratio between the main buffer memory 220 and the sub-buffer memory 300 to be 1:1 in order to improve the performance of the memory system 10 in the second mode.

According to various embodiments, when the monitoring result value is less than target performance in the second operation mode, the processor 201 may change the allocation ratio. For example, when the monitoring result value is less than the target performance, the processor 201 may set the allocation ratio between the main buffer memory 220 and the sub-buffer memory 300 as 9:1.

Figure 8:
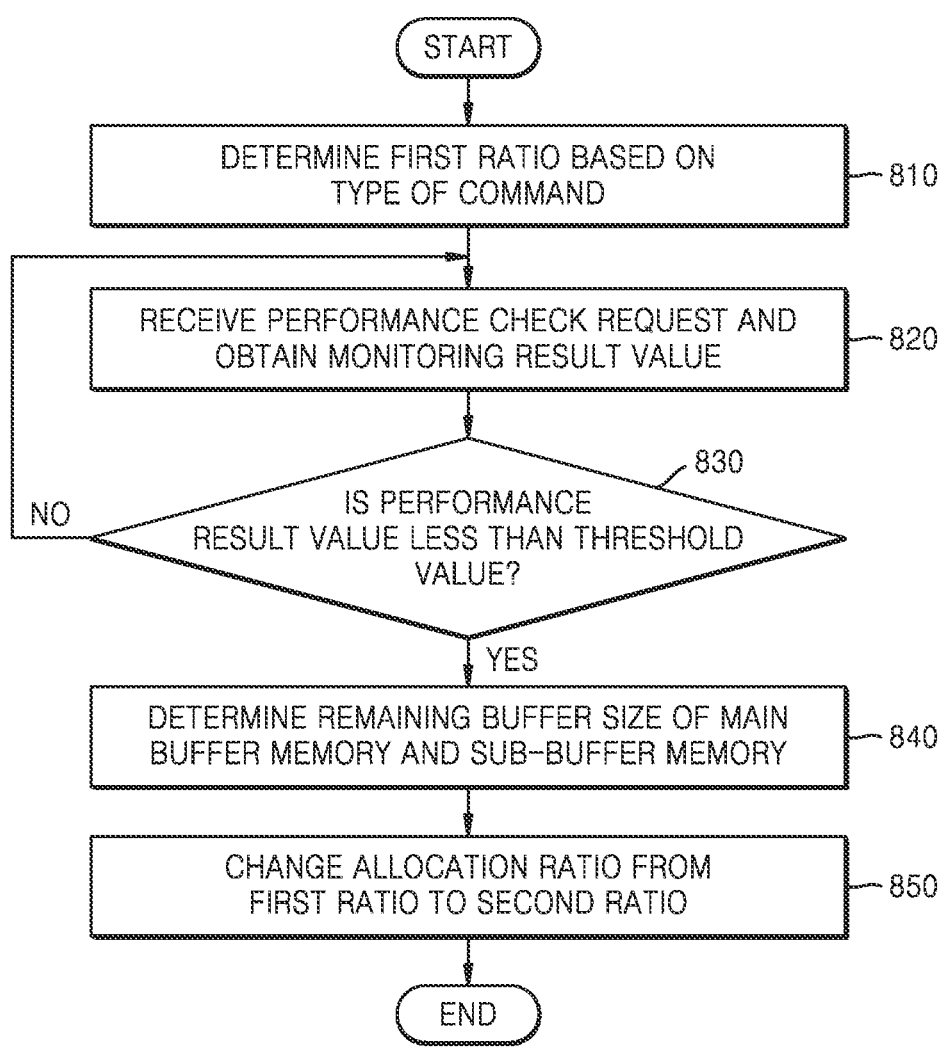
FIG. 8 is a flowchart illustrating an operation of a buffer allocation checker circuit according to an embodiment.

FIG. 8 is a flowchart illustrating an operation of the buffer allocation checker circuit 217 according to an embodiment.

Referring to FIG. 8, in operation 810, the buffer allocation checker circuit 217 may determine the first ratio between the main buffer memory 220 and the sub-buffer memory 300 based on a type of a command. For example, the buffer allocation checker circuit 217 may variably set the first ratio in accordance with the type of the command in the command queue management circuit 213. For example, when the type of the command corresponds to the sequential write command, the buffer allocation checker circuit 217 may set the allocation ratio between the main buffer memory 220 and the sub-buffer memory 300 as 1:1. As another example, when the type of the command corresponds to a random write command, the buffer allocation checker circuit 217 may set the allocation ratio between the main buffer memory 220 and the sub-buffer memory 300 as 1:9 because a minimum performance request may be satisfied although a large amount of buffer capacity is allocated to the sub-buffer memory 300.

In operation 820, the buffer allocation checker circuit 217 may receive the performance check request and may obtain the monitoring result value. For example, the processor 201 may transmit the performance check request to the buffer allocation checker circuit 217 at each time interval. The time interval may be predefined or preset. The buffer allocation checker circuit 217 may receive the performance result value from the monitoring circuit 219 in response to the performance check request.

In operation 830, the buffer allocation checker circuit 217 may determine whether the performance result value is less than the threshold value. The threshold value may vary in depending on the type of the command in the command queue management circuit 213. The buffer allocation checker circuit 217 may perform operation 840 when the performance result value is less than the threshold value (operation 830, YES). Otherwise, when the performance result value is equal to or greater than the threshold value (operation 830, NO), the process returns to operation 820.

In operation 840, the buffer allocation checker circuit 217 may determine the remaining buffer size. The buffer allocation checker circuit 217 may record the buffer allocation whenever a buffer is allocated to the main buffer memory 220 and the sub-buffer memory 300 to monitor the remaining buffer size of the main buffer memory 220 and sub-buffer memory 300.

In operation 850, the buffer allocation checker circuit 217 may change the allocation ratio between the main buffer memory 220 and the sub-buffer memory 300 from the first ratio to the second ratio. For example, when the first ratio between the main buffer memory 220 and the sub-buffer memory 300 is 1:9, and the remaining buffer size of the sub-buffer memory 300 is small, the buffer allocation checker circuit 217 may variably increase a ratio of the main buffer memory 220. For example, the buffer allocation checker circuit 217 may variably change the allocation ratio between the main buffer memory 220 and the sub-buffer memory 300 to 2:8 or 3:7.

Figure 9:
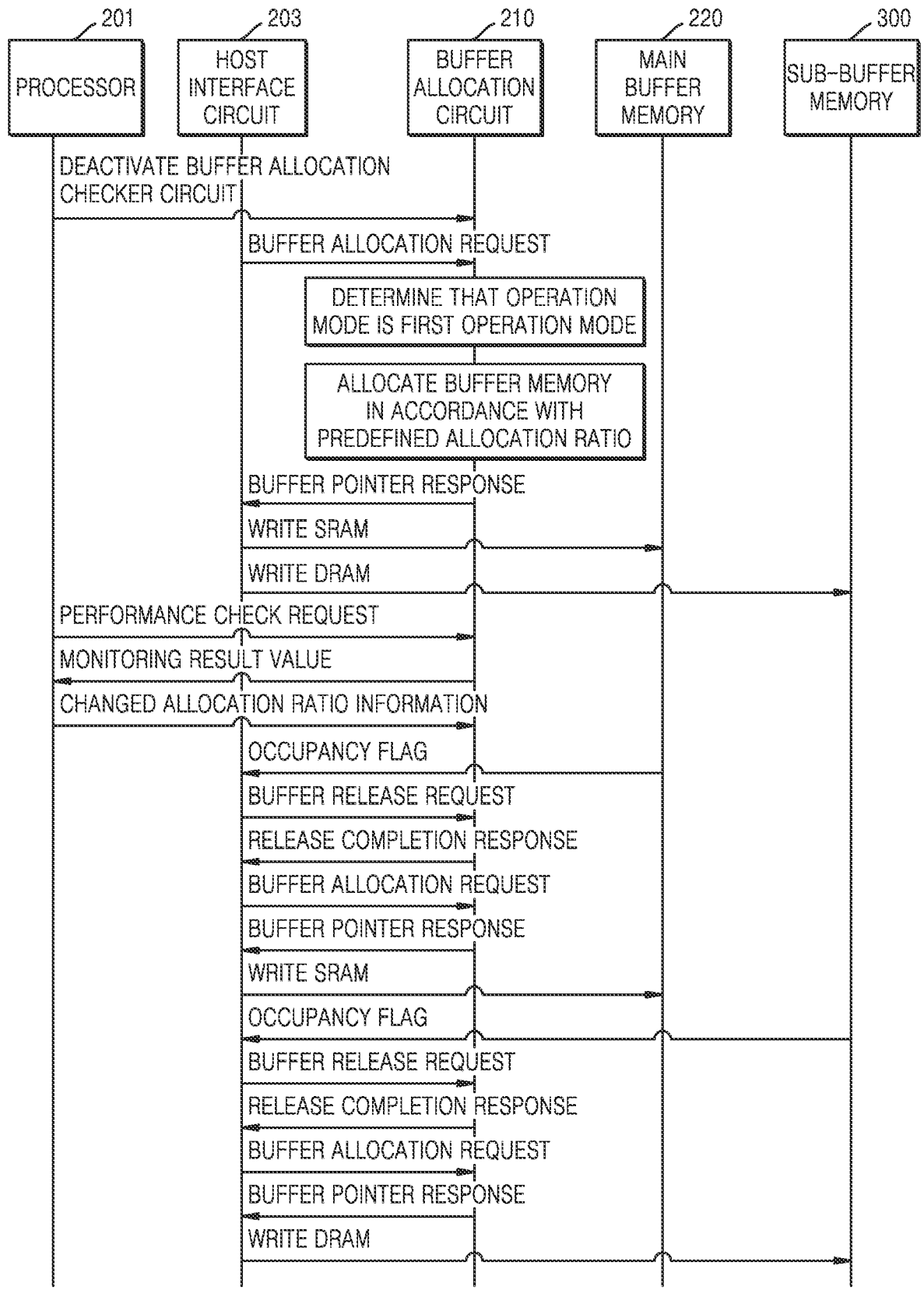
FIG. 9 is a signal exchange diagram corresponding to a first operation mode of a memory system according to an embodiment.

FIG. 9 is a signal exchange diagram corresponding to a first operation mode of a memory system according to an embodiment.

Referring to FIG. 9, the processor 201 may provide a control signal instructing the buffer allocation checker circuit 217 to be deactivated to the buffer allocation circuit 210. That is, the buffer allocation circuit 210 may allocate the main buffer memory 220 and the sub-buffer memory 300 in accordance with the fixed allocation ratio.

The host interface circuit 203 may provide a buffer allocation request to the buffer allocation circuit 210. The host interface circuit 203 may receive a command from the host HOST and may request the buffer allocation circuit 210 to allocate buffer memory for executing the command.

The buffer allocation circuit 210 may determine that the operation mode is the first operation mode. Specifically, in some embodiments, the buffer allocation circuit 210 may determine that the current operation mode is the first operation mode in response to the inactive state of the buffer allocation circuit 210. In some embodiments, the buffer allocation circuit 210 may request the special function register 211 to return the operation mode, and may determine the current operation mode based on a return value.

The buffer allocation circuit 210 may allocate buffer memory in a predefined allocation ratio. The buffer allocation circuit 210 may obtain the allocation ratio information through the special function register 211 in response to the buffer allocation request received from the host interface circuit 203. The special function register 211 may receive information on the fixed allocation ratio from the processor 201 and may store the received information therein.

The buffer allocation circuit 210 may generate a buffer pointer for each of the main buffer memory 220 and the sub-buffer memory 300, and may respond to the host interface circuit 203. For example, the buffer allocation circuit 210 may generate a first buffer pointer designated as a buffer region of the main buffer memory 220 and representing a position in which the write operation starts. The buffer allocation circuit 210 may generate a second buffer pointer designated as a buffer region of the sub-buffer memory 300 and representing a position in which the write operation starts. The first buffer pointer and the second buffer pointer may be generated by the buffer allocation handling circuit 215 in the buffer allocation circuit 210. The buffer allocation circuit 210 may provide the first buffer pointer and the second buffer pointer to the host interface circuit 203.

The host interface circuit 203 may perform the write operation on each of the main buffer memory 220 and the sub-buffer memory 300 based on the first and second buffer pointers received from the buffer allocation circuit 210. In some embodiments, the write operation for the main buffer memory 220 may be performed in parallel with the write operation for the sub-buffer memory 300. For example, when the sequential write command is received from the host HOST, at least some of data of the sequential write command is programmed to the main buffer memory 220, and the remaining data may be programmed to the sub-buffer memory 300.

The processor 201 may transmit the performance check request to the buffer allocation circuit 210. The performance check request may be transmitted from the processor 201 to the buffer allocation circuit 210 at each time interval. The time interval may be predefined or preset. Because the buffer allocation checker circuit 217 is deactivated in the first operation mode, the processor 201 may transmit the performance check request to the buffer allocation circuit 210 at each time interval in the first operation mode.

The buffer allocation circuit 210 may provide the monitoring result value to the processor 201 in response to the performance check request. Specifically, the monitoring circuit 219 in the buffer allocation circuit 210 may monitor and store a size of buffer memory allocated per unit time. For example, the monitoring circuit 219 may monitor the size of the buffer memory allocated per unit time and may store the monitoring result value in the special function register 211. The buffer allocation circuit 210 may respond to the monitoring result value through the special function register 211 in response to the performance check request received from the processor 201.

The processor 201 may receive the monitoring result value from the buffer allocation circuit 210, and when the monitoring result value is less than the threshold value, may provide the changed allocation ratio information to the buffer allocation circuit 210. For example, when the initially set allocation ratio is 1:9 and the sequential write command is input, the monitoring result value may be lowered to be less than the threshold value. Therefore, the processor 201 may provide the buffer allocation circuit 210 with the changed allocation ratio information representing the allocation ratio of 1:1 to improve performance.

The host interface circuit 203 may receive an occupancy flag from the main buffer memory 220. The occupancy flag may be for representing that the main buffer memory 220 is in the full occupancy state. The host interface circuit 203 may transmit a buffer release request to the buffer allocation circuit 210 in order to release the main buffer memory 220. The buffer allocation circuit 210 may release the buffer allocation of the main buffer memory 220 and may transmit a release completion response to the host interface circuit 203. The host interface circuit 203 may transmit the buffer allocation request again based on the release completion response. The buffer allocation circuit 210 may generate a buffer pointer and may provide the generated buffer pointer to the host interface circuit 203. In some embodiments, the buffer pointer may correspond to the first buffer pointer for the main buffer memory 220. The host interface circuit 203 may program data again based on the buffer pointer.

The host interface circuit 203 may receive an occupancy flag from the sub-buffer memory 300. The occupancy flag may be for representing that the sub-buffer memory 300 is in the full occupancy state. The host interface circuit 203 may transmit a buffer release request to the buffer allocation circuit 210 in order to release the sub-buffer memory 300. The buffer allocation circuit 210 may release the buffer allocation of the sub-buffer memory 300 and may transmit a release completion response to the host interface circuit 203. The host interface circuit 203 may transmit the buffer allocation request again based on the release completion response. The buffer allocation circuit 210 may generate a buffer pointer and may provide the generated buffer pointer to the host interface circuit 203. In some embodiments, the buffer pointer may correspond to the second buffer pointer for the sub-buffer memory 300. The host interface circuit 203 may program data again based on the buffer pointer.

Figure 10:
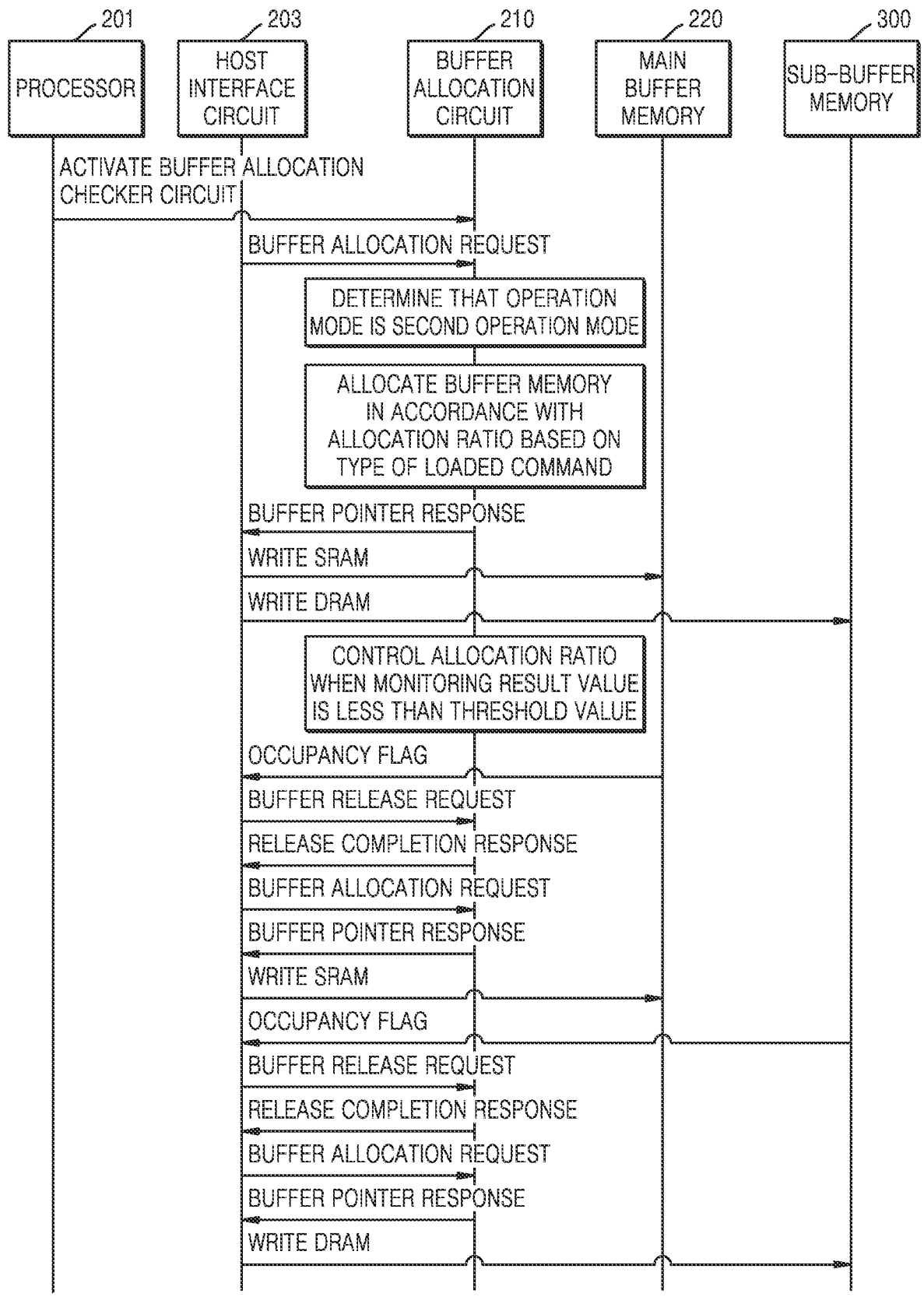
FIG. 10 is a signal exchange diagram corresponding to a second operation mode of a memory system according to an embodiment.

FIG. 10 is a signal exchange diagram corresponding to a second operation mode of a memory system according to an embodiment.

Referring to FIG. 10, the processor 201 may provide a control signal instructing the buffer allocation checker circuit 217 to be activated to the buffer allocation circuit 210. That is, the buffer allocation circuit 210 may allocate the main buffer memory 220 and the sub-buffer memory 300 in accordance with a variable allocation ratio without intervention of the processor 201.

The host interface circuit 203 may provide a buffer allocation request to the buffer allocation circuit 210. The host interface circuit 203 may receive a command from the host HOST and may request the buffer allocation circuit 210 to allocate buffer memory for executing the command.

The buffer allocation circuit 210 may determine that the operation mode is the second operation mode. Specifically, in some embodiments, the buffer allocation circuit 210 may determine that the current operation mode is the second operation mode in response to the active state of the buffer allocation circuit 210. In some embodiments, the buffer allocation circuit 210 may request the special function register 211 to return the operation mode, and may determine the current operation mode based on a return value.

The buffer allocation circuit 210 may allocate buffer memory in an allocation ratio based on a type of a loaded command. The buffer allocation circuit 210 may determine the type of the command in the command queue management circuit 213 in response to the buffer allocation request received from the host interface circuit 203. For example, when the sequential write command is to be processed by the command queue management circuit 213, the allocation ratio between the main buffer memory 220 and the sub-buffer memory 300 may be 1:1. As another example, when one of the random write command, the sequential read command, and the random read command is to be processed by the command queue management circuit 213, the allocation ratio between the main buffer memory 220 and the sub-buffer memory 300 may be 1:9.

The buffer allocation circuit 210 may generate a buffer pointer for each of the main buffer memory 220 and the sub-buffer memory 300, and may respond to the host interface circuit 203. For example, the buffer allocation circuit 210 may generate a first buffer pointer designated as a buffer region of the main buffer memory 220 and representing a position in which the write operation starts. The buffer allocation circuit 210 may generate a second buffer pointer designated as a buffer region of the sub-buffer memory 300 and representing a position in which the write operation starts. The first buffer pointer and the second buffer pointer may be generated by the buffer allocation handling circuit 215 in the buffer allocation circuit 210. The buffer allocation circuit 210 may provide the first buffer pointer and the second buffer pointer to the host interface circuit 203.

The host interface circuit 203 may perform the write operation on each of the main buffer memory 220 and the sub-buffer memory 300 based on the first and second buffer pointers received from the buffer allocation circuit 210. In some embodiments, the write operation for the main buffer memory 220 may be performed in parallel with the write operation for the sub-buffer memory 300. For example, when the sequential write command is received from the host HOST, at least some of data of the sequential write command is programmed to the main buffer memory 220, and the remaining data may be programmed to the sub-buffer memory 300.

The buffer allocation circuit 210 may track performance through the monitoring circuit 219. That is, the buffer allocation circuit 210 may control the allocation ratio when the monitoring result value is less than the threshold value. For example, when the size of the buffer memory allocated per unit time is less than the threshold value while executing the random write command, the ratio of the main buffer memory 220 may be increased from the set allocation ratio of 1:9.

The host interface circuit 203 may receive an occupancy flag from the main buffer memory 220. The occupancy flag may be for representing that the main buffer memory 220 is in the full occupancy state. The host interface circuit 203 may transmit a buffer release request to the buffer allocation circuit 210 in order to release the main buffer memory 220. The buffer allocation circuit 210 may release the buffer allocation of the main buffer memory 220 and may transmit a release completion response to the host interface circuit 203. The host interface circuit 203 may transmit the buffer allocation request again based on the release completion response. The buffer allocation circuit 210 may generate a buffer pointer and may provide the generated buffer pointer to the host interface circuit 203. In some embodiments, the buffer pointer may correspond to the first buffer pointer for the main buffer memory 220. The host interface circuit 203 may program data again based on the buffer pointer.

The host interface circuit 203 may receive an occupancy flag from the sub-buffer memory 300. The occupancy flag may be for representing that the sub-buffer memory 220 is in the full occupancy state. The host interface circuit 203 may transmit a buffer release request to the buffer allocation circuit 210 in order to release the sub-buffer memory 300. The buffer allocation circuit 210 may release the buffer allocation of the sub-buffer memory 300 and may transmit a release completion response to the host interface circuit 203. The host interface circuit 203 may transmit the buffer allocation request again based on the release completion response. The buffer allocation circuit 210 may generate a buffer pointer and may provide the generated buffer pointer to the host interface circuit 203. In some embodiments, the buffer pointer may correspond to the second buffer pointer for the sub-buffer memory 300. The host interface circuit 203 may program data again based on the buffer pointer.

Figure 11:
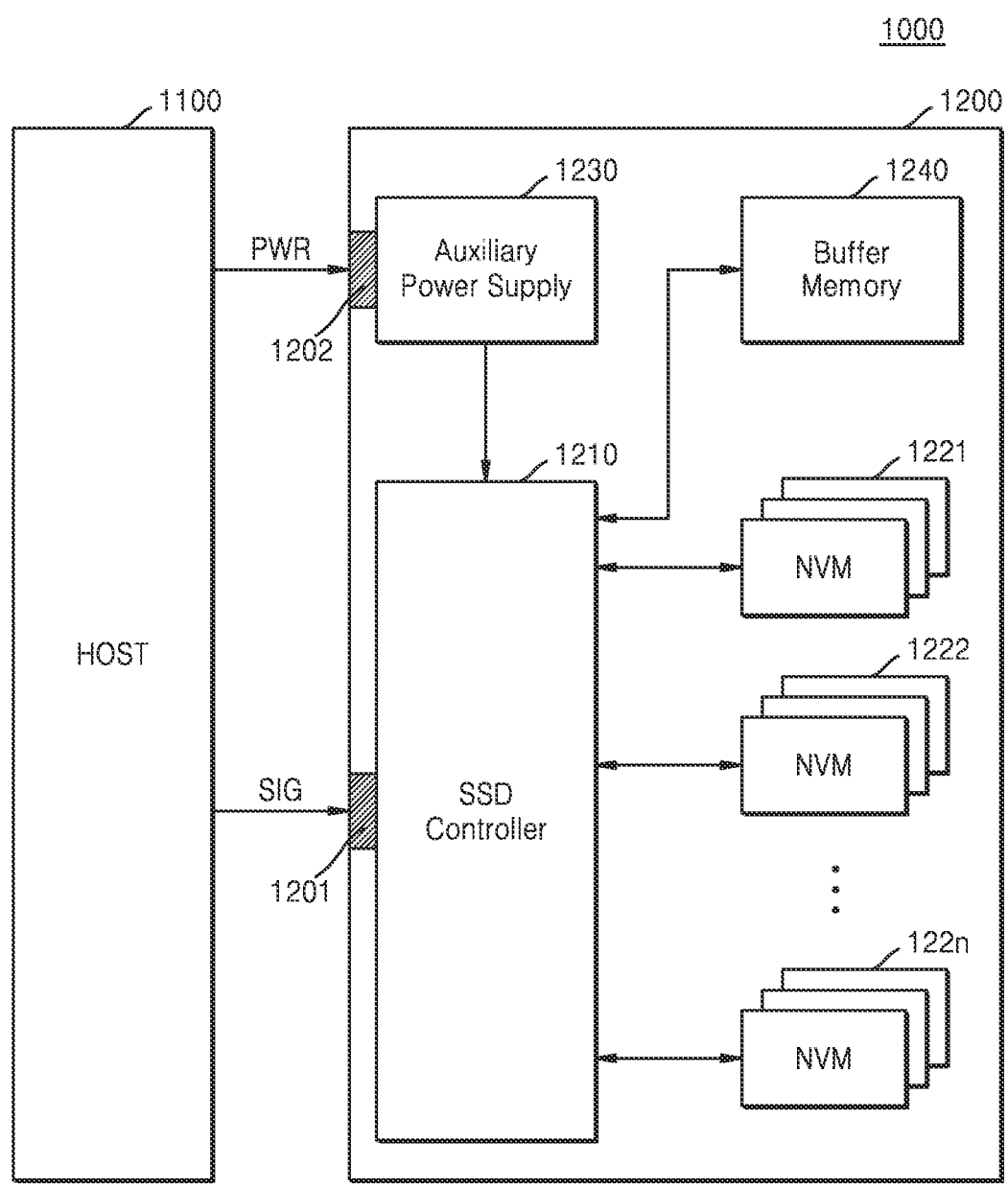
FIG. 11 is a block diagram illustrating an example of applying a memory system to a solid state drive (SSD) system according to embodiments.

FIG. 11 is a block diagram illustrating an example of applying a memory system to a solid state drive (SSD) system 1000 according to embodiments.

Referring to FIG. 11, the SSD system 1000 may include a host 1100 and a SSD 1200. The SSD 1200 transmits and receives a signal to and from the host 1100 through a signal connector 1201 and receives power through a power connector 1202. The SSD 1200 may include an SSD controller 1210, non-volatile memory devices 1221 to 122n, an auxiliary power supply 1230, and buffer memory 1240. The buffer memory 1240 may correspond to the sub-buffer memory 300 of FIG. 1. Each of the non-volatile memory devices 1221 to 122n may include NAND flash memory. The SSD 1200 may be implemented by using the embodiments described above with reference to FIGS. 1 to 10. That is, according to the above-described embodiments, the SSD controller 1210 included in the SSD 1200 may adaptively determine a buffer allocation ratio between different buffer memories (for example, the main buffer memory and the sub-buffer memory) based on the types of the commands in the command queue management circuit 213 and the performance result value.

While various embodiments has been particularly shown and described as examples, it will be understood that various changes in form and details may be made therein without departing from the scope of the following claims.

What is claimed is:

1. A method comprising:
receiving a command from a host;
determining an operation mode of a buffer allocation circuit in a memory controller as one of a first operation mode and a second operation mode;
when the buffer allocation circuit is in the first operation mode, setting an allocation ratio between a main buffer memory arranged in the memory controller and a sub-buffer memory arranged outside the memory controller to a predefined ratio; and
when the buffer allocation circuit is in the second operation mode, variably setting the allocation ratio based on whether a type of the command is a sequential write command,
wherein the variably setting of the allocation ratio comprises:
when the type of the command is the sequential write command, setting an allocation to the main buffer memory to be equal to an allocation to the sub-buffer memory; and
when the type of the command is remaining commands excluding the sequential write command, setting the allocation to the sub-buffer memory to be greater than the allocation to the main buffer memory.

2. The method of claim 1, further comprising:
receiving a flag representing that the main buffer memory is fully occupied;
delaying command processing for a predefined time based on reception of the flag; and
after the predefined time has elapsed and the flag has not been subsequently received, allocating a buffer to the main buffer memory.

3. The method of claim 1, further comprising:
monitoring a performance result value representing a size of a buffer allocated per unit time at each time interval; and
when the performance result value is less than a threshold value, increasing the allocation to the main buffer memory in the allocation ratio.

4. A memory system comprising:
a memory controller configured to control a memory device; and
a sub-buffer memory arranged outside the memory controller,
wherein the memory controller further comprises:
a processor configured to control a memory operation for the memory device;
a main buffer memory that is different from the sub-buffer memory and arranged in the memory controller; and
a buffer allocation circuit configured to control an allocation ratio between the sub-buffer memory and the main buffer memory,
wherein the processor sets the buffer allocation circuit to an operation mode in which the buffer allocation circuit variably sets the allocation ratio, based on whether a type of a memory command is a sequential write command,
wherein the variably setting of the allocation ratio comprises:
when the type of the memory command is the sequential write command, the buffer allocation circuit sets an allocation to the main buffer memory to be equal to an allocation to the sub-buffer memory; and
when the type of the memory command is remaining commands excluding the sequential write command, the buffer allocation circuit sets the allocation to the sub-buffer memory to be greater than the allocation to the main buffer memory.

5. The memory system of claim 4, wherein the main buffer memory is a static random access memory (SRAM), and
wherein the sub-buffer memory is a dynamic random access memory (DRAM).

6. The memory system of claim 4, wherein the buffer allocation circuit comprises:
a command queue management circuit configured to manage a plurality of memory commands;
a buffer allocation handling circuit configured to generate a pointer representing a position in which a buffer allocation of the main buffer memory and the sub-buffer memory starts; and
a buffer allocation checker circuit configured to variably set the allocation ratio.

7. The memory system of claim 6, wherein the buffer allocation checker circuit is activated while the buffer allocation circuit is operating in the operation mode.

8. The memory system of claim 6, wherein the buffer allocation checker circuit is configured to:
monitor a remaining buffer size of each of the main buffer memory and the sub-buffer memory,
receive a performance result value representing a size of a buffer allocated through a monitoring circuit per unit time at each time interval, and
when the performance result value is less than a threshold value, the buffer allocation checker circuit increases the allocation to the main buffer memory in the allocation ratio.

9. The memory system of claim 7, wherein the buffer allocation handling circuit is configured to:
receive a flag representing that the main buffer memory is fully occupied, instruct the command queue management circuit to standby for a predefined time based on the flag, and after the predefined time has elapsed and the flag has not been subsequently received, allocate a buffer to the main buffer memory.

10. The memory system of claim 6, wherein the buffer allocation checker circuit sets the allocation to the main buffer memory to be equal to the allocation to the sub-buffer memory when the type of the memory command corresponds to the sequential write command.

11. The memory system of claim 6, wherein the buffer allocation checker circuit sets the allocation to the sub-buffer memory to be greater than the allocation to the main buffer memory when the type of the memory command corresponds to the remaining commands excluding the sequential write command.

12. The memory system of claim 4, wherein the memory controller further comprises a host interface circuit configured to receive the memory command from a host and to request the buffer allocation circuit for buffer allocation.

13. A memory system comprising:
a memory controller configured to control a memory device; and
a sub-buffer memory arranged outside the memory controller,
wherein the memory controller comprises:
a processor configured to control a memory operation for the memory device according to one of a first operation mode and a second operation mode;
a main buffer memory that is different from the sub-buffer memory and arranged in the memory controller; and
a buffer allocation circuit configured to control an allocation ratio between the sub-buffer memory and the main buffer memory,
wherein the processor sets the buffer allocation circuit to the first operation mode in which the buffer allocation circuit controls the allocation ratio to be a fixed ratio,
wherein the processor transmits a performance check request to the buffer allocation circuit at each time interval and receives a performance result value based on the performance check request, and when the performance result value is less than a threshold value, the processor increases an allocation to the main buffer memory in the allocation ratio, and
wherein the performance result value corresponds to a size of buffer memory being allocated per unit time.

14. The memory system of claim 13, wherein the main buffer memory is a static random access memory (SRAM), and
wherein the sub-buffer memory is a dynamic random access memory (DRAM).

15. The memory system of claim 13, wherein the buffer allocation circuit comprises:
a special function register configured to receive allocation ratio information representing the allocation ratio from the processor and to store the allocation ratio information in the special function register;
a command queue management circuit configured to manage a plurality of commands;
a buffer allocation handling circuit configured to generate a pointer representing a position in which a buffer allocation of the main buffer memory and the sub-buffer memory starts; and
a buffer allocation checker circuit configured to variably set the allocation ratio in accordance with a type of a command of the plurality of commands.

16. The memory system of claim 15, wherein the buffer allocation checker circuit is deactivated while the buffer allocation circuit operates in the first operation mode.

17. The memory system of claim 15, wherein the buffer allocation handling circuit is configured to:
receive a flag representing that the main buffer memory is fully occupied,
instruct the command queue management circuit to standby for a predefined time based on the flag, and
after the predefined time has elapsed and the flag has not been subsequently received, allocate a buffer to the main buffer memory.

18. The memory system of claim 13, wherein the memory controller further comprises a host interface circuit configured to receive a memory command from a host and to request the buffer allocation circuit for buffer allocation.

* * * * *